US011199186B2

(12) United States Patent
Slesinski et al.

(10) Patent No.: US 11,199,186 B2
(45) Date of Patent: Dec. 14, 2021

(54) PRESSURIZED FLUID SUPPLY APPARATUS AND METHOD OF SUPPLYING PRESSURIZED FLUID

(71) Applicant: Dana Heavy Vehicle Systems Group, LLC, Maumee, OH (US)

(72) Inventors: Steven G. Slesinski, Maumee, OH (US); Harry W. Trost, Maumee, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 539 days.

(21) Appl. No.: 16/116,213

(22) Filed: Aug. 29, 2018

(65) Prior Publication Data

US 2019/0063414 A1 Feb. 28, 2019

Related U.S. Application Data

(60) Provisional application No. 62/552,815, filed on Aug. 31, 2017.

(51) Int. Cl.
| | |
|---|---|
| *F04B 35/00* | (2006.01) |
| *F04B 35/01* | (2006.01) |
| *B60C 23/10* | (2006.01) |
| *F04B 27/08* | (2006.01) |
| *F04B 9/04* | (2006.01) |
| *B60C 23/12* | (2006.01) |
| *F04B 39/12* | (2006.01) |

(Continued)

(52) U.S. Cl.
CPC ............ *F04B 35/004* (2013.01); *B60C 23/10* (2013.01); *B60C 23/12* (2013.01); *F04B 9/042* (2013.01);
(Continued)

(58) Field of Classification Search
CPC ....... B60C 23/003; B60C 23/10; B60C 23/12; B60S 5/04; B60S 5/043; F04B 9/04; F04B 9/042; F04B 9/06; F04B 27/0873; F04B 27/0882; F04B 27/0886; F04B 27/0891; F04B 27/0895; F04B 35/01; F04B 35/06; F04B 35/004; F04B 39/12; F04B 39/121;
(Continued)

(56) References Cited

U.S. PATENT DOCUMENTS

| | | |
|---|---|---|
| 2,977,891 A | 4/1961 | Bishop |
| 4,606,710 A | 8/1986 | Maguire |

(Continued)

FOREIGN PATENT DOCUMENTS

WO  2012012617 A2  1/2012

OTHER PUBLICATIONS

European Patent Office, European Search Report issued in EP 18 191 816, dated Jan. 17, 2019, 10 pages, European Patent Office, Munich, Germany.

*Primary Examiner* — Dominick L Plakkoottam
*Assistant Examiner* — Charles W Nichols
(74) *Attorney, Agent, or Firm* — McCoy Russell LLP

(57) ABSTRACT

A pressurized fluid supply apparatus and method of supplying pressurized fluid is provided. The pressurized fluid supply apparatus includes a housing configured to rotate about an axis, at least one fluid pump coupled to the housing and configured to pressurize a fluid therein, and at least one movable element disposed within the housing. The at least one movable element is configured to move within the housing when the housing rotates about the axis, which causes the at least one movable element to be in periodic driving engagement with the at least one fluid pump to cause the fluid to be pressurized.

19 Claims, 3 Drawing Sheets

(51) Int. Cl.
  *F04B 41/06* (2006.01)
  *F16K 15/20* (2006.01)
  *B60C 23/00* (2006.01)
  *B60S 5/04* (2006.01)
(52) U.S. Cl.
  CPC .......... *F04B 27/0895* (2013.01); *F04B 35/01* (2013.01); *F04B 39/121* (2013.01); *F04B 41/06* (2013.01); *B60C 23/003* (2013.01); *B60S 5/04* (2013.01); *F16K 15/20* (2013.01)
(58) Field of Classification Search
  CPC ........ F04B 41/06; F16K 15/20; F16K 15/202; F16K 15/205
  See application file for complete search history.

(56) References Cited

U.S. PATENT DOCUMENTS

| | | | |
|---|---|---|---|
| 4,922,984 A | 5/1990 | Dosjoub et al. | |
| 5,505,080 A * | 4/1996 | McGhee | B60C 23/004 116/34 R |
| 5,934,882 A * | 8/1999 | Olney | B60C 23/12 417/231 |
| 7,581,576 B2 | 9/2009 | Nakano | |
| 7,922,459 B2 | 4/2011 | Isono | |
| 7,926,530 B2 | 4/2011 | Isono | |
| 8,013,724 B2 | 9/2011 | Isono | |
| 8,042,585 B2 | 10/2011 | Isono | |
| 8,052,400 B2 | 11/2011 | Isono | |
| 8,123,494 B2 | 2/2012 | Wakabayashi et al. | |
| 8,479,791 B2 * | 7/2013 | Schulte | B60C 23/12 152/419 |
| 8,763,661 B2 | 7/2014 | Richardson | |
| 2007/0151648 A1 * | 7/2007 | Loewe | B60C 23/004 152/419 |
| 2008/0190535 A1 | 8/2008 | Concu | |
| 2016/0167465 A1 * | 6/2016 | Hinque | B60C 23/001 152/419 |
| 2017/0113500 A1 * | 4/2017 | Gau | B60C 23/12 |
| 2017/0166018 A1 * | 6/2017 | Hinque | B60C 23/004 |

* cited by examiner

US 11,199,186 B2

PRESSURIZED FLUID SUPPLY APPARATUS AND METHOD OF SUPPLYING PRESSURIZED FLUID

CROSS REFERENCE TO RELATED APPLICATION

This application is entitled to claim the benefit of, and claims priority to, U.S. provisional patent application Ser. No. 62/552,815 filed Aug. 31, 2017, the entire disclosure of which is incorporated herein by reference.

FIELD

This present disclosure relates to an apparatus for supplying pressurized fluid, and more particularly, to an apparatus for supplying pressurized fluid to a desired location in a vehicle.

BACKGROUND

Tire inflation systems for vehicles are becoming crucial in certain vehicles such as, for example, trucks, tractors, and commercial vehicles. Tire inflation systems are utilized to measure and adjust the tire pressure to provide the vehicle with versatility for differing terrain types and reduce maintenance requirements. For example, tire pressure may be decreased to provide additional traction for the vehicle or may be increased to reduce a rolling resistance of the vehicle.

Central tire inflation systems can be complex and expensive. Distributed systems can be less expensive. However, the distributed systems known in the art tend to fail and are limited in their application. Accordingly, it would be desirable to provide an apparatus that overcomes the deficiencies of the known designs.

SUMMARY

In concordance and agreement with the present disclosure, an apparatus for supplying pressurized fluid to a desired location in a vehicle that overcomes the deficiencies of the known art, has surprisingly been discovered.

In one embodiment, a pressurized fluid supply apparatus, comprises: a housing configured to rotate about an axis; a first fluid pump coupled to the housing, the first fluid pump configured to pressurize a fluid; and at least one movable element disposed within the housing and configured to move therein when the housing rotates about the axis, wherein the at least one movable element is in periodic driving engagement with the first fluid pump to cause the fluid to be pressurized to a first pressure.

In another embodiment, a pressurized fluid supply apparatus, comprises: a housing configured to rotate about an axis; at least one fluid pump coupled to the housing, the at least one fluid pump configured to pressurize a fluid, wherein a portion of the at least one fluid pump is configured to rotate about the axis with the housing; and at least one movable element disposed within the housing and configured to move therein when the housing rotates about the axis, wherein a movement of the at least one movable element within the housing is substantially independent from a rotation of the portion of the at least one fluid pump about the axis, and wherein the at least one movable element is in periodic driving engagement with the portion of the at least one fluid pump to cause the fluid to be pressurized.

In yet another embodiment, a method of supplying pressurized fluid, the method comprises the steps of: providing a housing configured to rotate about an axis; providing at least one fluid pump coupled to the housing, the at least one fluid pump configured to pressurize a fluid; providing at least one movable element disposed within the housing and configured to move therein when the housing rotates about the axis; and causing the at least one movable element to periodically drivingly engage the at least one fluid pump to cause the fluid to be pressurized.

As aspects of certain embodiments, the housing includes a flange formed thereon.

As aspects of certain embodiments, the flange is configured to mount the housing onto a vehicle.

As aspects of certain embodiments, the housing includes an annular channel formed therein.

As aspects of certain embodiments, the at least one movable element is configured to travel within the annular channel of the housing.

As aspects of certain embodiments, the first fluid pump includes a reciprocating piston and at least one cam follower.

As aspects of certain embodiments, the at least one movable element is in periodic driving engagement with the at least one cam follower to urge the reciprocating piston of the first fluid pump in a first direction and cause the fluid to be pressurized to the first pressure.

As aspects of certain embodiments, the at least one movable element is a roller element having a generally spherical shape.

As aspects of certain embodiments, the pressurized fluid supply apparatus further comprises a second fluid pump coupled to the housing, the second fluid pump configured to pressurize the fluid.

As aspects of certain embodiments, the second fluid pump includes a reciprocating piston and at least one cam follower.

As aspects of certain embodiments, the at least one movable element is in periodic driving engagement with the at least one cam follower to urge the reciprocating piston of the second fluid pump in a first direction and cause the fluid to be pressurized to a second pressure.

As aspects of certain embodiments, the second fluid pump is in fluid communication with the first fluid pump.

As aspects of certain embodiments, the second pressure is greater than the first pressure.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
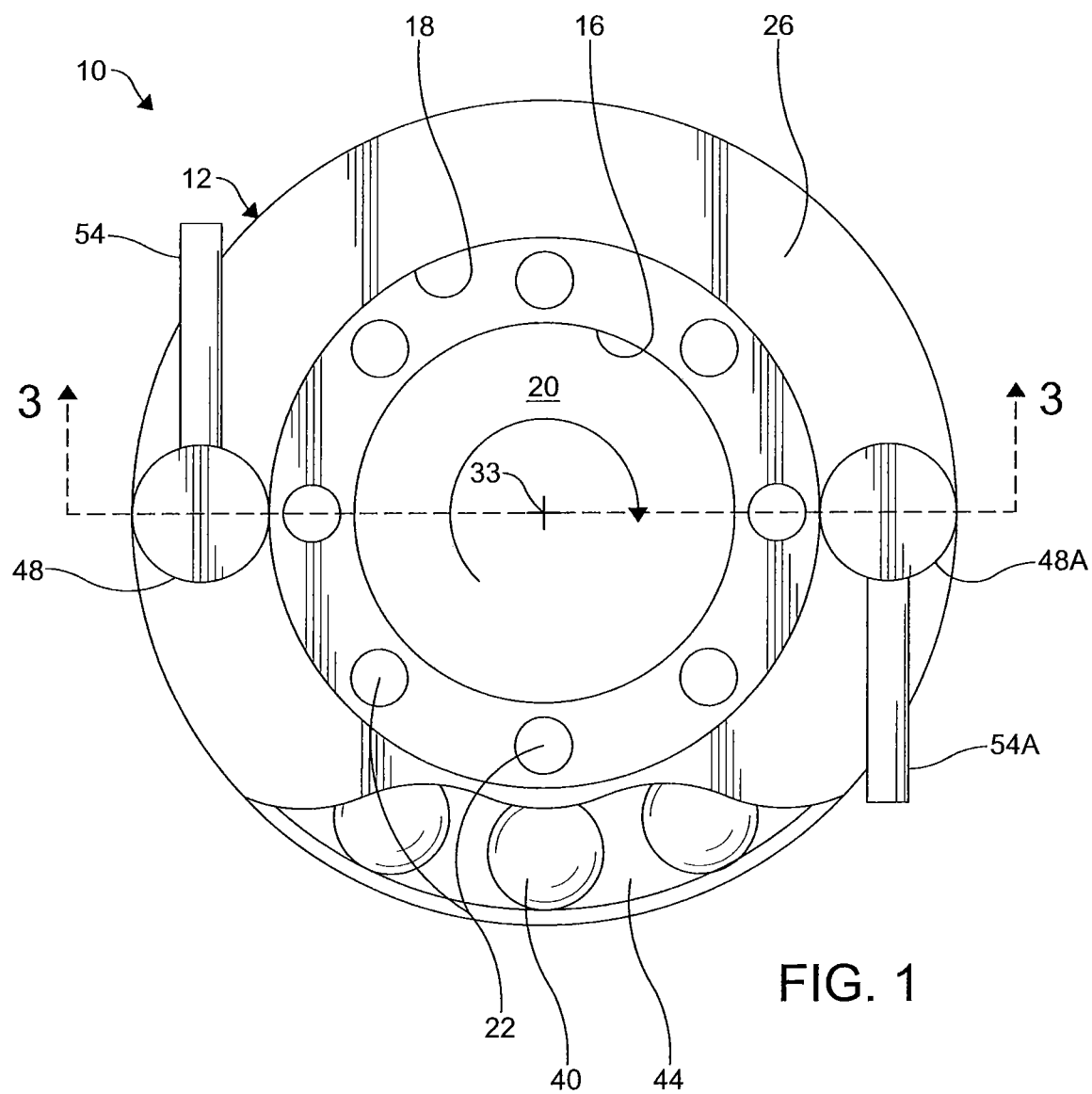
FIG. 1 is a front elevational view of an embodiment of a pressurized fluid supply apparatus in accordance with the present disclosure, wherein a portion of a housing of the pressurized fluid supply apparatus has been removed to show at least one movable element therein.

It is to be understood that the invention may assume various alternative orientations and step sequences, except where expressly specified to the contrary. It is also to be understood that the specific assemblies and processes illustrated in the attached drawings, and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

Figure 2:
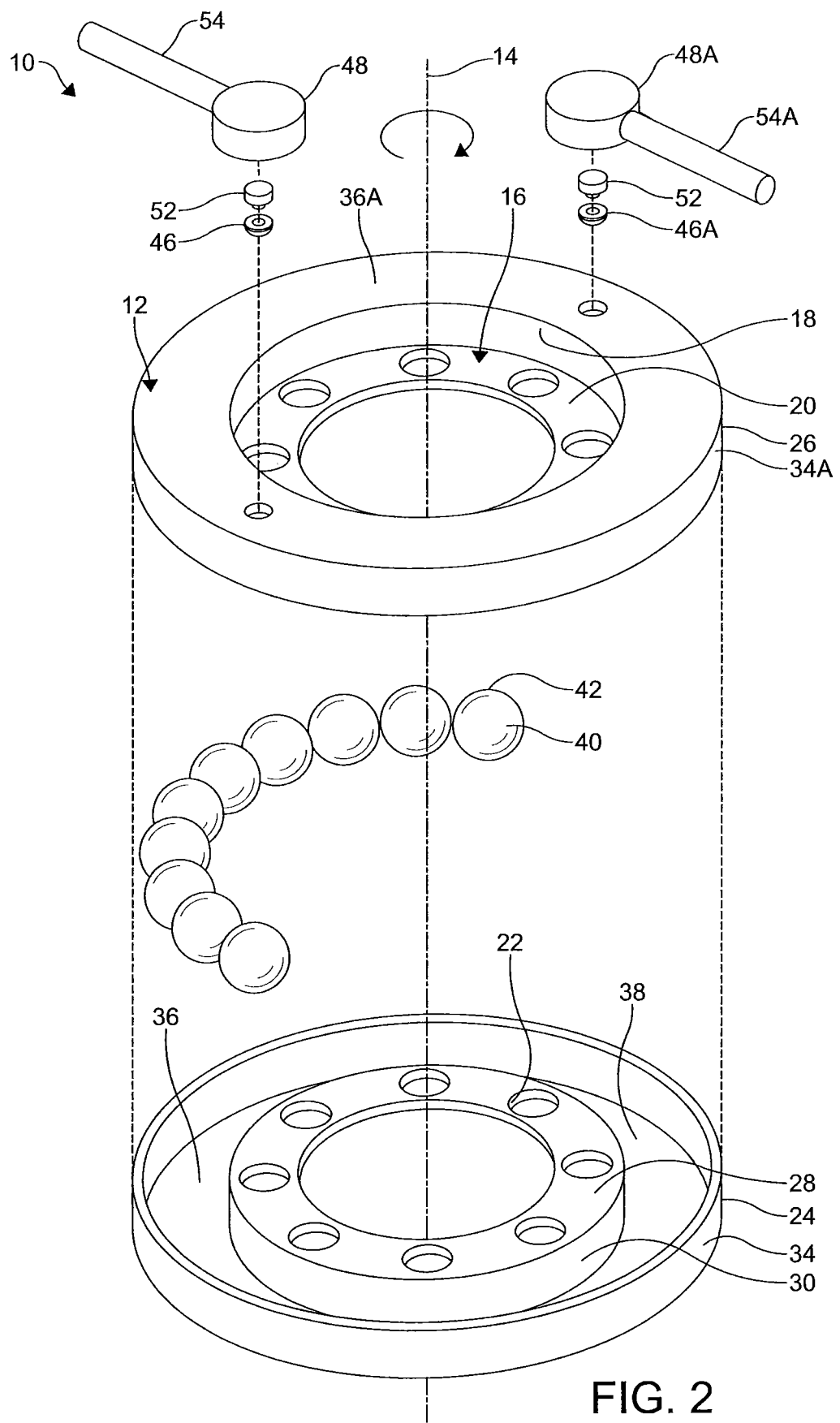
FIG. 2 is an exploded perspective view of the pressurized fluid supply apparatus of FIG. 1.
Figure 3:
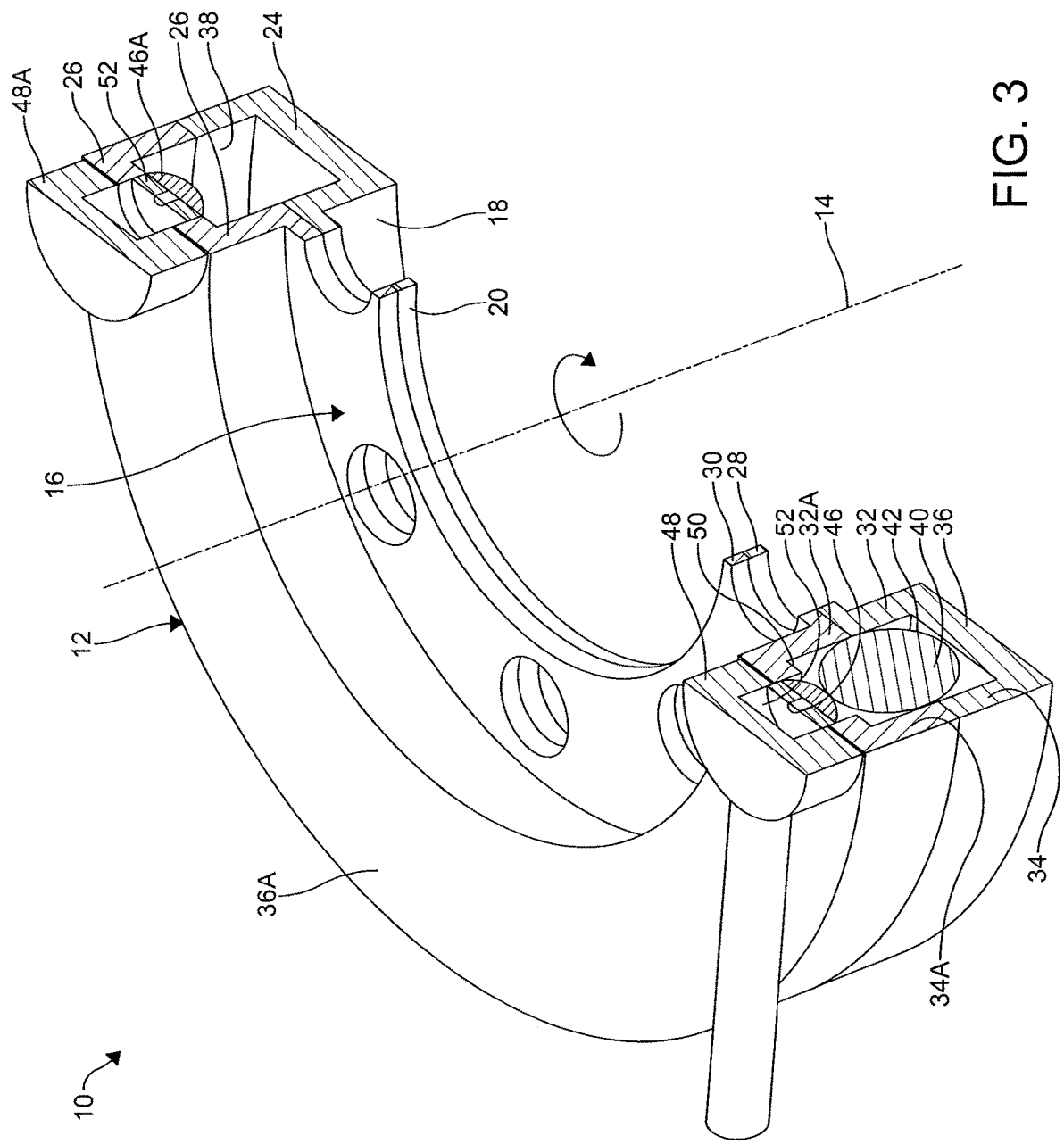
FIG. 3 is a sectional view of the pressurized fluid supply apparatus of FIGS. 1-2.

Embodiments of a pressurized fluid supply apparatus 10 are described herein and illustrated in FIGS. 1-3. The pressurized fluid supply apparatus 10 is configured to provide a fluid (not shown) to a desired location (not shown). In certain embodiments, the fluid is air. Various other types of fluid may be employed with the pressurized fluid supply apparatus 10 if desired. The pressurized fluid supply apparatus 10 will be described for use adjacent a wheel end (not depicted) of a vehicle (not depicted). The pressurized fluid supply apparatus 10 may have applications to passenger, commercial and off-highway vehicles such as, for example, trucks, tractors, earth-moving vehicles and military vehicles. The pressurized fluid supply apparatus 10 could also have industrial, locomotive, and aerospace applications.

The pressurized fluid supply apparatus 10 comprises a hollow housing 12. Preferably, the housing 12 has an annular shape. It is understood, however, that the housing 12 can have any shape and size as desired. In one embodiment, the annular-shaped housing 12 allows the pressurized fluid supply apparatus 10 to be mounted for rotation about an axis of rotation 14 and adjacent an end of an axle assembly (not depicted). For example, the pressurized fluid supply apparatus 10 may be mounted adjacent an end of a drive axle assembly. In certain applications, a plurality of pressurized fluid supply apparatuses 10 is employed. Preferably, at least one of the pressurized fluid supply apparatuses 10 is mounted for rotation adjacent each end of the axle assembly. For example, one of the pressurized fluid supply apparatuses 10 may be mounted around a hub cap (not depicted) adjacent a first end of a steer axle assembly (not depicted) and another one of the pressurized fluid supply apparatuses 10 may be mounted around a hub cap adjacent a second end of the steer axle assembly. In other embodiments, any number of the pressurized fluid supply apparatuses 10 may be mounted at various other locations of the vehicle such as to a hub, around a spindle, around the wheel or in the wheel, to the axle shaft studs, via bolts to the wheel studs, to a brake drum or a disc brake rotor, and the like, for example.

In the embodiment of FIG. 1, the pressurized fluid supply apparatus 10 includes a flange member 16 having a generally annular shape. It is understood that the flange member 16 can have size and shape as desired. In certain applications, the flange member 16 may be used to mount the pressurized fluid supply apparatus 10 to the axle. As shown, the flange member 16 extends radially inward from an inner diameter portion 18 of the housing 12 and defines a center opening 20 of the apparatus 10. The flange member 16 may be integrally formed with the inner diameter portion 18 of the housing 12 or a separate and distinct component and coupled to the inner diameter portion 18 of the housing 12. The annular flange 16 may comprise a plurality of holes 22 formed therein. A fastener (not depicted) may be provided through each of the holes 22 to mount the pressurized fluid supply apparatus 10 to the vehicle.

As illustrated in FIGS. 2-3, the housing 12 may also comprise a first portion 24 and a second portion 26. In the embodiment shown, each of the portions 24, 26 may be formed in a unitary manner with respective portions 28, 30 of the flange member 16. In other embodiments, only one of the portions 24, 26 may be integrally formed with or coupled to the flange member 16. Each of the portions 24, 26 comprises an inner wall 32, 32A extending substantially parallel to a central axis 33 of the pressurized fluid supply apparatus 10, an outer wall 34, 34A opposite the inner wall 32, 32A and extending substantially parallel to the central axis 33, and an outer wall 36, 36A formed between the walls 32, 32A, 34, 34A and extending substantially perpendicular to the central axis 33. The walls 32, 32A, 34, 34A, 36, 36A define a channel 38 having a generally annular shape within the housing 12. The channel 38 is provided between the inner wall 32, 32A and the outer wall 34, 34A of each portion 24, 26 and between the outer walls 36, 36A of each portion 24, 26. It is understood that the channel 38 can have any shape and size as desired.

As best illustrated in FIGS. 2-3, a plurality of movable elements 40 is disposed in the channel 38. In certain embodiments, the movable elements 40 are roller elements having a generally spherical shape. However, it should be appreciated that the movable elements 40 can be any type of movable element 40 with any shape and size as desired. In certain embodiments, a cage (not depicted) is provided around one or more of the movable elements 40. Providing the cage, connects the movable elements 40 to each other which provides a larger moving mass and enhanced pumping capacity. Preferably, each movable element 40 is of a solid construction and formed from a durable material such as, for example, a metal. In an embodiment, each movable element 40 comprises a substantially uniform outer surface 42. In this embodiment, the outer surface 42 comprises a diameter. As shown in FIG. 1, one or more voids 44 may be provided between the outer surface 42 of each movable element 40 and the outer surface 42 of an adjacent movable element 40.

The movable elements 40 are configured to travel along a generally circular path within the channel 38 and about the axis of rotation 14 of the pressurized fluid supply apparatus 10. Due to the shape of the movable elements 40 and the effects of gravity, the movable elements 40 are configured to travel within the channel 38 substantially independent from the rotation of the housing 12. Each of the movable elements 40 is at least periodically in driving engagement with one or more cam followers 46, 46A which are illustrated best in FIG. 2. In other embodiments, each of the movable elements 40 is at least periodically in driving engagement with more or less cam followers 46, 46A, if desired.

As illustrated in FIG. 2, each of the cam followers 46, 46A may be of a generally hemispherical shape and resilient. A resilience of each of the cam followers 46, 46A may be provided by forming the cam followers 46, 46A from a resilient material or a mechanical mechanism. Each of the cam followers 46, 46A is disposed adjacent an axial inner surface 50 of the outer wall 36A of the second portion 26. At least a portion of each of the cam followers 46, 46A extends past the inner surface 50 of the outer wall 36A and into the channel 38.

The cam followers 46, 46A are configured to rotate with the housing 12. Accordingly, the movable elements 40 are also configured to travel within the channel 38 substantially independent from the rotation of the cam followers 46, 46A. The travel of the movable elements 40 within the channel 38 causes at least one of the movable elements 40 to at least periodically drivingly engage the portion of each of the cam followers 46, 46A extending in the channel 38. The driving engagement between the movable elements 40 and the cam followers 46, 46A causes the cam followers 46, 46A to be urged in a first direction toward the inner surface 50 of the outer wall 36A. When the cam followers 46, 46A are not in driving engagement with the movable elements 40, the cam followers 46, 46A are urged in an opposite second direction away from the inner surface 50 of the outer wall 36A into a void 44 between the outer surfaces 42 of adjacent movable elements 40.

Each of the cam followers 46, 46A shown is provided as a portion of a respective fluid pumps 48, 48A. In certain embodiments, the cam followers 46, 46A are connected to a reciprocating piston 52 of the fluid pumps 48, 48A. As illustrated, each of the fluid pumps 48, 48A is coupled to the housing 12. More particularly, each of the fluid pumps 48, 48A is coupled to the outer wall 36A of the second portion 26 of the housing 12. As noted above, the driving engagement between the movable elements 40 and the cam followers 46, 46A urges the cam followers 46, 45A in the first direction toward the inner surface 50 of the outer wall 36A and, after such driving engagement by movable elements 40, the cam followers 46, 46A are urged in the second direction away from the inner surface 50 of the outer wall 36A into the voids 44 between the outer surfaces 42 of adjacent movable elements 40. In certain embodiments, each of the fluid pumps 48, 48A may further include a biasing element (not shown) such as a coil spring and the like, for example, to urge at least one of the pistons 52 and the cam followers 46, 46A in the second direction away from the inner surface 50 of the outer wall 36A into the voids 44 between the movable elements 40. Movement of the cam followers 46, 46A toward and away from the inner surface 50 of the outer wall 36A drives the reciprocating pistons 52 connected to the respective cam followers 46, 46A. Each of the reciprocating pistons 52 compresses and pressurizes the fluid and may extend into and through the outer wall 36A. From the reciprocating pistons 52, the pressurized fluid is directed to a pressure regulator provided as a portion of the fluid pumps 48, 48A.

Each of the fluid pumps 48, 48A is capable of individually supplying pressurized fluid to a tire of the vehicle. However, in certain embodiments, the fluid pumps 48, 48A may be in fluid communication with each other to enable multiple stage pressurization of the fluid supplied to the tire. In these embodiments, one of the fluid pumps 48, 48A compresses and pressurizes the fluid and provides the pressurized fluid to another one of the fluid pumps 48, 48A at a first pressure. The pressurized fluid provided by one of the fluid pumps 48, 48A may be directed to another one of the fluid pumps 48, 48A via a reservoir (not depicted) and at least one fluid conduit (not shown). In this embodiment, the reservoir may be in fluid communication with one of the fluid pumps 48, 48A on a first end thereof and another one of the fluid pumps 48, 48A on a second end thereof. In these embodiments, the fluid received by another one of the fluid pumps 48, 48A is further compressed and pressurized to a second pressure and then directed to the tire. As should be appreciated, the second pressure is greater than the first pressure. Also, in embodiments where a multiple stage pressurization is utilized, one or more check valves may be provided in the flow conduit for the fluid supplied by one of the fluid pumps 48, 48A to another one of the fluid pumps 48, 48A.

Referring back to FIG. 1, the pressurized fluid can be directed from each fluid pump 48, 48A to the desired location (e.g. the tire) via a conduit assembly 54, 54A or another conduit to increase the pressure therein (e.g. a tire pressure) as desired. The pressurized fluid can also be regulated so that when the desired pressure is reached, a pressure relief valve (not depicted) can plunge open or shut which urges a locking mechanism or another interference into the channel 38 and the path of travel of the movable elements 40 preventing the movement thereof. If the movable elements 40 are prevented from moving along the path of travel, each of the fluid pumps 48, 48A will cease creating the pressurized fluid.

During operation, the pressurized fluid supply apparatus 10 may be activated by rotation. For example, when the pressurized fluid supply apparatus 10 is mounted to a wheel end structure, the pressurized fluid supply apparatus 10 may be activated by rotation of the wheel. When the wheel starts to rotate, the housing 12 rotates at the same speed as the wheel it is mounted to, but the degrees of freedom of the movable elements 40 under the influence of gravity causes the movable elements 40 disposed therein to move substantially independent from the housing 12 along the path of travel within the channel 38. As the movable elements 40 move along the path of travel in the channel 38, they encounter at least one of the cam followers 46, 46A. As consecutive movable elements 40 at least periodically drivingly engage the cam followers 46, 46A, the reciprocating pistons 52 of the fluid pumps 48, 48A are forced up and down which create the pressurized fluid that can be directed to the desired location (e.g. the tire).

In accordance with the provisions of the patent statutes, the present disclosure of the subject matter has been described in what is considered to represent its preferred embodiments. However, it should be noted that the subject matter can be practiced otherwise than as specifically illustrated and described without departing from its spirit or scope.

What is claimed:

1. A pressurized fluid supply apparatus, comprising:
   a housing configured to couple to a component and to rotate about an axis responsive to rotation of the component;
   a first fluid pump coupled to the housing, wherein the first fluid pump is activated when the component rotates and wherein activation of the first fluid pump pressurizes a fluid; and
   at least one movable element enclosed within a channel of the housing and configured to move therein when the housing rotates about the axis, wherein the channel circumferentially extends around the axis;
   wherein the at least one movable element is in periodic driving engagement with the first fluid pump to cause the fluid to be pressurized to a first pressure; and
   wherein the first fluid pump includes a reciprocating piston reciprocating in an axial direction relative to the housing and at least one cam follower and wherein the at least one cam follower is hemispherically-shaped and is positioned within a wall of the channel.

2. The pressurized fluid supply apparatus according to claim 1, wherein the housing includes a flange formed thereon.

3. The pressurized fluid supply apparatus according to claim 2, wherein the flange is configured to mount the housing onto a vehicle.

4. The pressurized fluid supply apparatus according to claim 1, wherein the channel is an annular channel.

5. The pressurized fluid supply apparatus according to claim 4, wherein the at least one movable element is configured to travel in a circular path within the annular channel of the housing.

6. The pressurized fluid supply apparatus according to claim 1, wherein the first fluid pump includes a reciprocating piston and at least one cam follower.

7. The pressurized fluid supply apparatus according to claim 6, wherein the at least one movable element is in periodic driving engagement with the at least one cam follower to urge the reciprocating piston of the first fluid pump in a first direction and cause the fluid to be pressurized to the first pressure.

8. The pressurized fluid supply apparatus according to claim 1, wherein the at least one movable element is a roller element having a generally spherical shape.

9. The pressurized fluid supply apparatus according to claim 1, further comprising a second fluid pump coupled to the housing, wherein the second fluid pump is configured to pressurize the fluid.

10. The pressurized fluid supply apparatus according to claim 9, wherein the second fluid pump includes a reciprocating piston and at least one cam follower.

11. The pressurized fluid supply apparatus according to claim 10, wherein the at least one movable element is in periodic driving engagement with the at least one cam follower to urge the reciprocating piston of the second fluid pump in a first direction and cause the fluid to be pressurized to a second pressure.

12. The pressurized fluid supply apparatus according to claim 11, wherein the second fluid pump is in fluid communication with the first fluid pump.

13. The pressurized fluid supply apparatus according to claim 12, wherein the second pressure is greater than the first pressure.

14. A pressurized fluid supply apparatus, comprising:
a housing configured to rotate about an axis;
at least one fluid pump coupled to the housing, wherein the at least one fluid pump configured to pressurize a fluid, wherein the at least one fluid pump is activated when the component rotates, and wherein activation of the at least one fluid pump pressurizes a fluid; and
at least one movable element enclosed within a channel of the housing and configured to move therein when the housing rotates about the axis, wherein a movement of the at least one movable element within the housing is substantially independent from a rotation of the portion of the at least one fluid pump about the axis, and wherein the at least one movable element is in periodic driving engagement with the portion of the at least one fluid pump to cause the fluid to be pressurized;
wherein the channel circumferentially extends around the axis; and
wherein the first fluid pump includes a reciprocating piston reciprocating in an axial direction relative to the housing and at least one cam follower and wherein the at least one cam follower is hemispherically-shaped and is positioned within a wall of the channel.

15. A method of supplying pressurized fluid, the method comprising:
activating at least one fluid pump in a pressurized fluid supply apparatus by rotating a component coupled to a housing of the pressurized fluid supply apparatus;
while the at least one fluid pump is activated, causing at least one movable element in the pressurized fluid supply apparatus to periodically drivingly engage a camming element in the at least one fluid pump to cause a fluid to be pressurized;
wherein the at least one movable element is enclosed within a channel of the housing and configured to move therein when the housing rotates;
wherein the channel circumferentially extends around an axis of rotation of the housing; and
wherein the first fluid pump includes a reciprocating piston reciprocating in an axial direction relative to the housing and at least one cam follower and wherein the at least one cam follower is hemispherically-shaped and is positioned within a wall of the channel.

16. The pressurized fluid supply apparatus according to claim 1, wherein the component is a vehicle tire.

17. The pressurized fluid supply apparatus according to claim 1, wherein the at least one movable element has a spherical shape.

18. The pressurized fluid supply apparatus according to claim 1, wherein the housing includes a flange configured to attach to the component.

19. The pressurized fluid supply apparatus according to claim 1, wherein:
a first wall, a second wall, and a third wall of the channel are positioned on three distinct sides of the at least one moveable element;
at least one cam follower is positioned in a fourth wall; and
the fourth wall is arranged on a fourth side of the at least one moveable element.

* * * * *